United States Patent [19]
Tryber et al.

[11] 4,394,608
[45] Jul. 19, 1983

[54] MACHINE TOOL TRACING SYSTEM

[75] Inventors: Robert E. Tryber; George A. Hoffman, both of Racine, Wis.

[73] Assignee: Gettys Manufacturing Co., Inc., Racine, Wis.

[21] Appl. No.: 208,698

[22] Filed: Nov. 20, 1980

[51] Int. Cl.³ ............................................. G05B 19/36
[52] U.S. Cl. .................................... 318/578; 318/616; 364/474
[58] Field of Search ............... 318/578, 616, 617, 625; 364/474

[56] References Cited
U.S. PATENT DOCUMENTS

| | | | |
|---|---|---|---|
| 3,743,910 | 7/1973 | Wise | 318/578 |
| 3,956,680 | 5/1976 | Maecker | 318/578 |
| 4,084,244 | 4/1978 | Floter | 318/578 X |
| 4,164,694 | 8/1979 | Amsbury | 318/578 |
| 4,276,503 | 6/1981 | Peiffert | 318/578 X |
| 4,334,272 | 6/1982 | Imazeki et al. | 318/578 X |

*Primary Examiner*—B. Dobeck
*Attorney, Agent, or Firm*—Darby & Darby

[57] ABSTRACT

A velocity control for a machine tool tracing system reduces the operating speed of the system in response to a rapid change of phase angle in the tracing stylus deflection produced, for example, when tracing the contour of a sharp angle or inside corner of a template.

8 Claims, 3 Drawing Figures

MACHINE TOOL TRACING SYSTEM

BACKGROUND OF THE INVENTION

This invention relates to automatic tracing systems for controlling the operation of machine tools. In particular, this invention relates to a velocity control device capable of achieving both high accuracy and high speed of operation.

In conventional tracing systems, the deflection of a tracing stylus relative to a template produces control signals which are used to guide the movement of the stylus around a contour of the template and, correspondingly, to position a machine tool relative to a workpiece such that the tool machines an identical contour around the workpiece. Transducers in the stylus head produce signals corresponding to the stylus deflection relative to a reference coordinate system, whereby the magnitude and direction of the deflection of the stylus as it traces the contour of the template are resolved into its vector components. As the deflection vector is ideally normal to the template contour, and the movement of the stylus is always tangential relative to the template, the orientation of the velocity command vector for the tracing movement is derived by rotating the deflection vector 90°.

The magnitude of the velocity command vector is generally set to a desired tracing speed for the system. In conventionally tracing systems the set speed is typically a compromise value balancing the advantages of high-speed tracing against the need for accurate machine response. If the speed is too high, the system cannot accurately respond to sharp changes in the contour of the template. For example, when negotiating an inside corner of the template at high speed, the abrupt change of direction may result in an excessive deflection error before the system can recover, thereby causing the tool to overcut the workpiece. Thus, the full tracing speed capacity of the system is not entirely realized because of the need to accommodate sharp corners in the template contour. Operation at a lower tracing speed means that the system will be slower and less productive. Attempts to provide an increased response capability have resulted in rather complex systems, for example, using an eccentric stylus with direction-of-motion controls or tracing systems offset from the operation of the machine tool.

OBJECTS OF THE INVENTION

It is therefore a principal object of the invention to provide a tracing system which can be operated at high speeds and yet responds accurately to sharp corners or changes of direction in the template contour.

In particular, it is an object of the invention to provide a tracing system which responds to the detection of a rapid change in deflection angle by reducing the operating speed of the system.

SUMMARY OF THE INVENTION

In accordance with this invention, an improved machine tool tracing system includes a velocity control which derives a signal indicative of the rate of change of deflection angle of the stylus and subtracts the derived signal from a set speed command signal in order to obtain a velocity command signal modulated in accordance with the difficulty of the contour being traced. In the preferred embodiment of the invention, a phase-locked-loop circuit generates a signal corresponding to the rate of change of stylus deflection angle, and a multiple thereof is subtracted from the set speed command signal. The velocity control also includes means for further reducing the set speed command signal by a multiple of an excess deflection error signal. Thus, when the stylus undergoes a deflection indicative of a sharp change of direction in the template contour, the tracing speed is quickly reduced to permit an accurate machine tool response. However, when the stylus is tracing along an easily negotiable contour of the template, its tracing speed is maintained at a desired high rate for the system.

THE DRAWINGS

DETAILED DESCRIPTION

Figure 1:
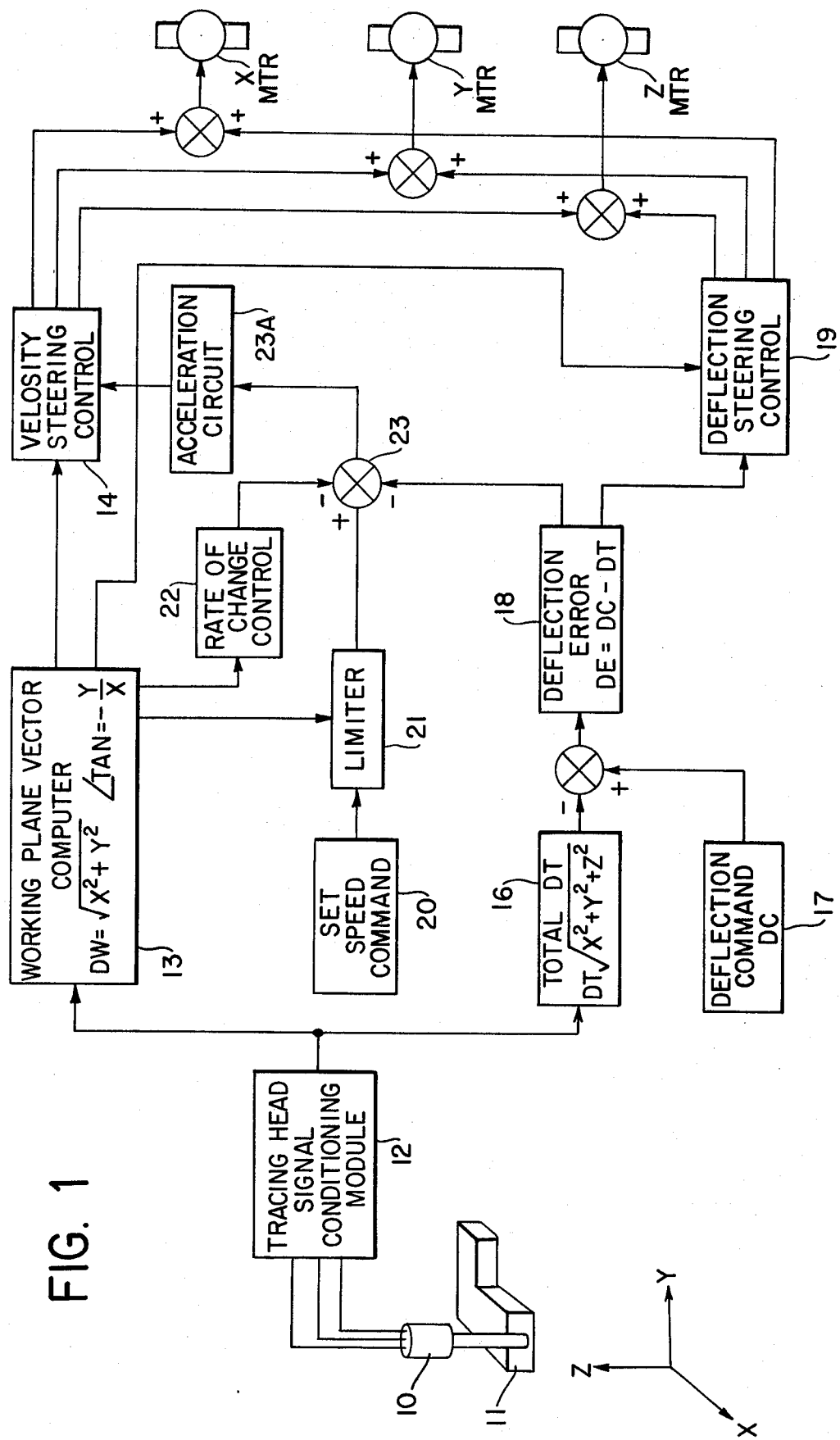
FIG. 1 is a block diagram illustrating the components of a machine tool tracking system according to the invention.

The invention utilizes an improved velocity control which measures the rate of directional change, i.e., phase angle change of the stylus deflection vector, in order to reduce the set speed command for the tracing system. Reduction of the set speed command permits the system to accurately negotiate a rapid rate of directional change at a reduced speed. Outside corners do not present as difficult a problem as inside corners, even at relatively high speeds, because the turning radius to be negotiated is large in comparison to the operative margin of deflection for the stylus. Thus, the invention has particular advantages with respect to high speed turns at inside corners in a template contour.

In conventional tracing systems, a stylus traces a contour around a template in a working plane. For three-dimensional objects, the stylus is incremented relative to the template along an orthogonal feed axis upon completion of the contour in each working plane. The movement of the stylus relative to the template is accomplished by a servo-control system which operates at a desired tracing speed and is steered in response to the deflection of the stylus as it moves in contact along the template contour. It is to be understood that any appropriate coordinate reference system can be selected for operation of the tracing system, and that the servo-controls may be implemented to move the stylus around the template or vice-versa. For convenience, it will be assumed that the stylus moves around the template in a working plane defined by two orthogonal reference axes with incremental feed along an orthogonal third axis.

The deflection of the stylus as it moves around the template is maintained at an operating point selected in accordance with known criteria to provide a one-to-one model to workpiece relationship and to give the system adequate time to respond to the stylus movement. This nominal deflection represents the null point or zero error condition, and the steering controls move the stylus so as to maintain this condition. Since the deflection of the stylus is ideally normal to the template surface, and movement of the stylus always tangential to the surface, the tangential or velocity steering of the stylus is controlled as a function of the deflection vector, essentially by the equivalent of rotating it 90° to the tangential direction the working plane. Positioning the stylus relative to the template to maintain a zero error condition, or deflection steering, is also controlled as a function of the deflection vector. Thus, the system detects and utilizes deflection signals from the stylus indicating the magnitude and direction of deflection in order to move the stylus normal to the surface and constantly restore the deflection of the stylus to the null point. The operation and implementation of such conventional features of machine tool tracing systems are well-known to those skilled in the art and need not be discussed further. The discussion which follows is therefore directed to the improved velocity control of the invention.

Referring to FIG. 1, a machine tool tracing system moves a stylus 10 around a contour of the template 11 in a working plane shown, for example, with reference to the X-Y coordinate axes. The head of the stylus has transducers oriented with the coordinate axes which produce alternating signals in proportion to the deflection of the stylus along each of the axes, the tracer being shown here as a three-axis system. The tracing head signals are modified in the conditioning module 12 to produce corresponding deflection signals at a carrier frequency of 1,000 hz (for example) the magnitudes of which are proportional to the amount of deflection along a respective axis. The module 12 also filters the signals for spurious and quadrature signals. A working plane vector computer 13 generates a deflection vector signal DW having a magnitude equal to the magnitude of deflection in the working plane, and a signal phase corresponding to the angle of the deflection vector in the working plane relative to the reference coordinate axes. The working plane deflection vector signal is demodulated by the velocity steering control 14 in order to produce signals for controlling the corresponding servomotors 15 in the respective coordinate axes.

The deflection signals are also utiized to maintain operation of the system around the null point or zero error condition. The total magnitude DT of the deflection in all three axes is derived at block 16 and subtracted from the amount of desired deflection DC supplied by the deflection command 17. DT is equal to the square root of the sum of the squares of deflection magnitude along the respective axes. The difference DE at block 18 represents the deflection error for the system. The deflection steering control 19 responds to detection of a deflection error DE and to signals indicating the orientation of the deflection vector in the working plane, and corrects the deflection error by providing control signals to the servomotors 15. Thus, if the total deflection is greater than the desired nominal deflection, the deflection steering control 19 operates the servomotors to move the stylus in the direction of deflection in order to eliminate the error. If the total deflection is less than the desired nominal deflection, the stylus is repositioned in a direction 180° out of phase with the deflection vector.

In the speed control of the invention, a desired operating speed is set for the system, indicated at block 20. The set speed command is limited at block 21 in accordance with the average amount of deflection in the working plane as supplied from block 13. The limiter 21 thus maintains a desired ratio between average deflection and operating speed to ensure that the system does not overrun itself.

The central feature of the invention is the rate-of-change control 22 which receives the working plane deflection vector signals and reduces the speed command for the system upon the deflection of a rapid rate of phase change in the deflection vector. Thus, when the stylus encounters a sharp change of deflection direction the tracing system slows down in order to permit negotiation of the directional change without error. The speed command is also reduced at junction 23 by the absolute value of the deflection error DE.

The correction for deflection error commands the system to go to a lower speed whenever there is a departure from the null point of operation. For example, deflection less than the desired deflection when tracing an outside corner represents the tendency of the stylus to fly off from the template. On the other hand, when tracing an inside corner, the total deflection of the stylus is the sum of the desired deflection as it moves along one wall and the deflection generated upon encountering the opposing wall. In both cases, the speed command for the system is reduced by an amount proportional to the magnitude of the deflection error. This provides an additional means of altering the tracing speed of the system in accordance with detected anomalies in operating conditions.

The corrected speed command from junction 23 is coupled to the velocity steering control 14 by means of an acceleration circuit 23A. The output of acceleration circuit 23A follows a decreasing input instantly but rises slowly when its input increases. Thus, circuit 23A, which is conventional, permits immediate decleration but only gradual acceleration.

Figure 2:
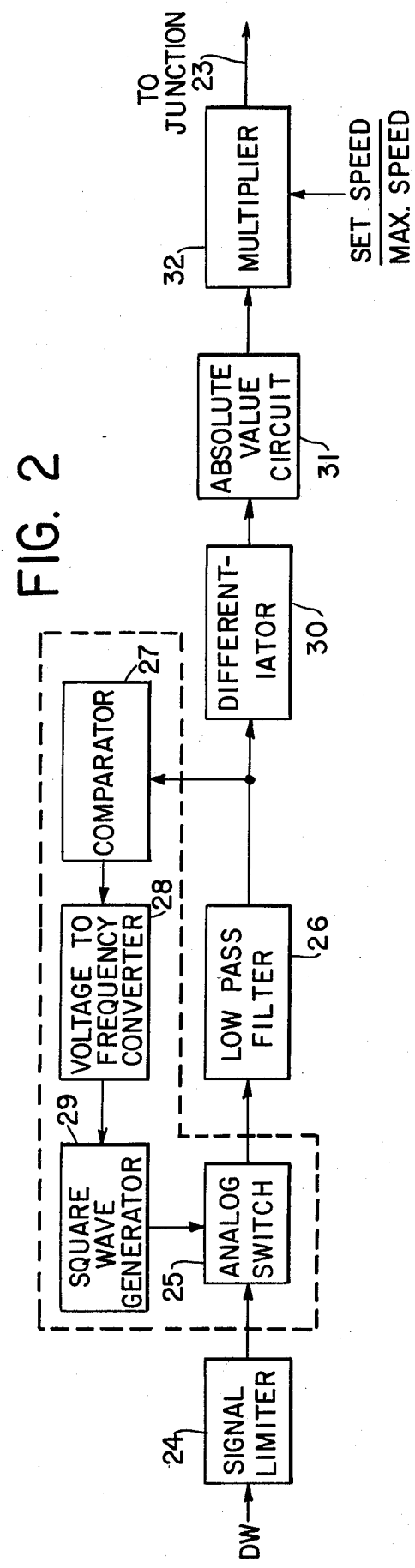
FIG. 2 is a block diagram of a preferred velocity control circuit of the invention.

A preferred form of the rate-of-change control 22 is illustrated in FIG. 2. The input DW from the working plane vector computer 13 is a time varying signal having a phase corresponding to the angle of the deflection vector relative to the coordinate axes of the working plane. A signal limiter 24 modifies the DW into a square wave retaining the phase of DW. A phase-locked-loop is employed to produce a voltage-level output indicating the net change of phase in the signal DW. The loop includes an analog switch 25 which is turned on in response to a difference between the phase of DW and a reference square wave signal. The frequency of the reference signal is constantly adjusted through a comparator 27, a voltage-to-frequency generator 28, and a square wave generator 29 so as to track or lock on to the phase of DW. The elements 25, 27, 28, and 29 of the loop, indicated by dashed lines in FIG. 2 constitute a free running square wave generator which, for example, can be obtained commercially as an integrated chip No. 565 sold by Signetics Corp. The voltage signal generated by a change of phase in DW is passed through a low pass filter 26 and then differentiated by differentiator 30 to produce a rate of change of phase angle signal indicative of the rate of directional change of the deflection vector. The output of the differentiator 30 is further conditioned in an absolute value circuit 31 to provide a "stop" signal independent of directional change. The gain of this signal is reduced in a multiplier 32 by a factor, for example, equal to the ratio of the set speed to the maximum speed. Thus, the rate-of-change control 22 provides the capability of adjusting or modulating the operating speed of the system in accordance with the difficulty of contour being traced.

Figure 3:
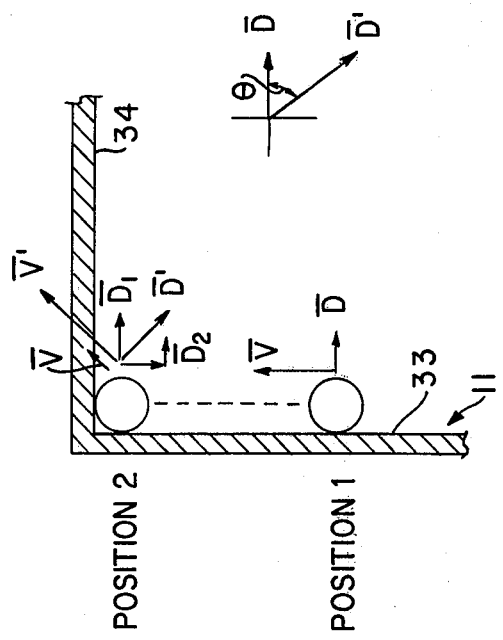
FIG. 3 is a vector diagram of a tracing stylus at an inside corner of a template, illustrating the improved response of the tracing system of the invention.

The operation of the velocity control according to the invention is now illustrated with reference to FIG. 3. At Position 1 the stylus 10 is shown moving tangentially with respect to the wall 33 of the template 11. Deflection of the stylus is normal to the template 11 and has a magnitude equal to the deflection selected for operation at the null point, as indicated by the vector D. The stylus is steered as shown by velocity vector V 90° out of phase from D and at a desired operating speed. Upon encountering the opposing wall 34 at Position 2, the deflection vector D' equals the sum of the deflection $D_1$ imposed by the wall 33 and $D_2$ imposed by the wall 34. Since $D_1$ at the moment of contact with the wall 34 is equal to D' and since $D_2$ will also have a significant value before the system can respond to change the stylus' direction of movement, the total deflection D' is at an angle O which is not normal to the wall 34.

In conventional systems without the velocity control of the invention, the velocity steering of the stylus at Position 2 would be given by the vector V' in a direction into the wall 34 at a magnitude equal to the operating speed. This will result in gouging the opposing wall of the machined workpiece before the system can respond with an abrupt turn in stylus movement. However, with the velocity control described herein, the speed of movement of the stylus toward the wall 34 is sharply reduced or zeroed (shown as V'') as soon as a measurable value for $D_2$ is present such that any rapid change of phase angle from D to D' can be detected. Once the stylus has substantially reduced its movement toward the wall 34, the normal operation of the stylus tangential to the wall can be resumed. In practice, this results in a smooth change of directions with accurate tracing and machining of the workpiece.

The above-described embodiments are illustrative of the invention and are not intended to encompass all the various forms of the invention. For example, the velocity control for the tracing system may be implemented in the form of reduction by digital techniques wherein a rapid change of phase in the deflection vector resulted in the introduction of an appropriate signal stored in a digital memory. Similarly, the system may be implemented digitally to respond to the measured phase angle of DW and provided the desired speed reduction based upon a look-up table in memory. Further, the entire system may be implemented by digital equivalents of the analog components described. All of such modifications and other variations as would be apparent to one skilled in the art based upon the disclosure herein are intended to be encompassed within the spirit and scope of the invention as defined in the following claims.

What is claimed is:

1. A control system wherein a stylus traces a contour around a template, and wherein the template moves relative to the stylus in response to deflection of the stylus by moving contact with the template, comprising means for detecting a rate of change of the deflection angle of the stylus from said template, and means for producing a signal for controlling the magnitude of the velocity of said template relative to said stylus in response to the rate of change of deflection angle.

2. For use in a machine tool tracing system wherein means are provided for moving a stylus around a template at an operating speed in response to deflection of the stylus from the template, a speed control circuit, comprising means for producing a signal indicative of a rate of change of deflection angle of the stylus from said template, and means for altering said operating speed in response to said signal.

3. A speed control circuit according to claim 2, further comprising means for producing a signal indicative of the magnitude of the stylus deflection in the working plane, and means for altering the operating speed of the moving means in response to the deflection magnitude signal.

4. A speed control circuit according to claim 2, further comprising means for producing a signal indicative of the magnitude of the total stylus deflection, means for producing a signal corresponding to a desired magnitude of deflection of the stylus relative to the template, and means for altering the operating speed of the moving means in response to a difference between the total deflection magnitude signal and the desired deflection magnitude signal.

5. A machine tool tracing system wherein a stylus traces a contour around a template in a working plane, comprising means for moving the stylus relative to the template at an operating speed in the working plane, means for producing a deflection signal having a phase angle indicative of the direction of stylus deflection in the working plane, means for deriving a speed control signal in response to the rate of change of the phase angle of said deflection signal, and means for altering the operating speed of the moving means in response to said speed control signal.

6. The tracing system of claim 5, further comprising means for producing a signal indicative of the magnitude of the stylus deflection in the working plane, and means for altering the operating speed of the moving means in response to the deflection magnitude signal.

7. The tracing system of claim 4 further comprising means for producing a signal indicative of the magnitude of the total stylus deflection, means for producing a signal corresponding to a desired magnitude of deflection of the stylus relative to the template, and means for altering the operating speed of the moving means in response to a difference between the total deflection magnitude signal and the desired deflection magnitude signal.

8. A process for automatically tracing a contour around a template with a stylus, comprising moving the template at an operating speed relative to the stylus in response to deflection of the stylus from the template, producing a signal indicative of a rate of change of deflection angle of the stylus from said template, and altering said operating speed in response to the rate of change of deflection angle.

* * * * *